G. ARMBRUSTER.
PORTABLE MOLD FOR FENCE POSTS.
APPLICATION FILED JAN. 24, 1914.
1,131,653.
Patented Mar. 16, 1915.
2 SHEETS—SHEET 2.
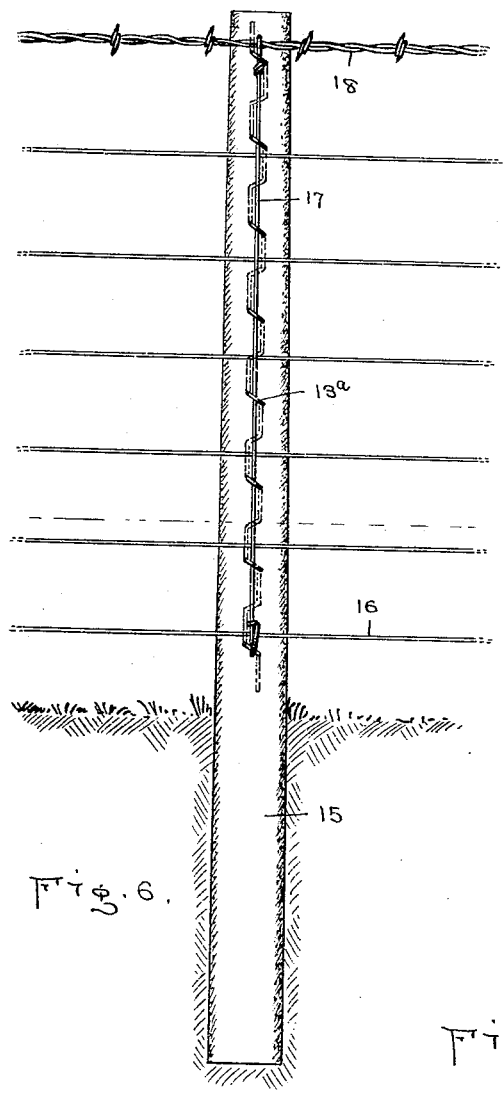
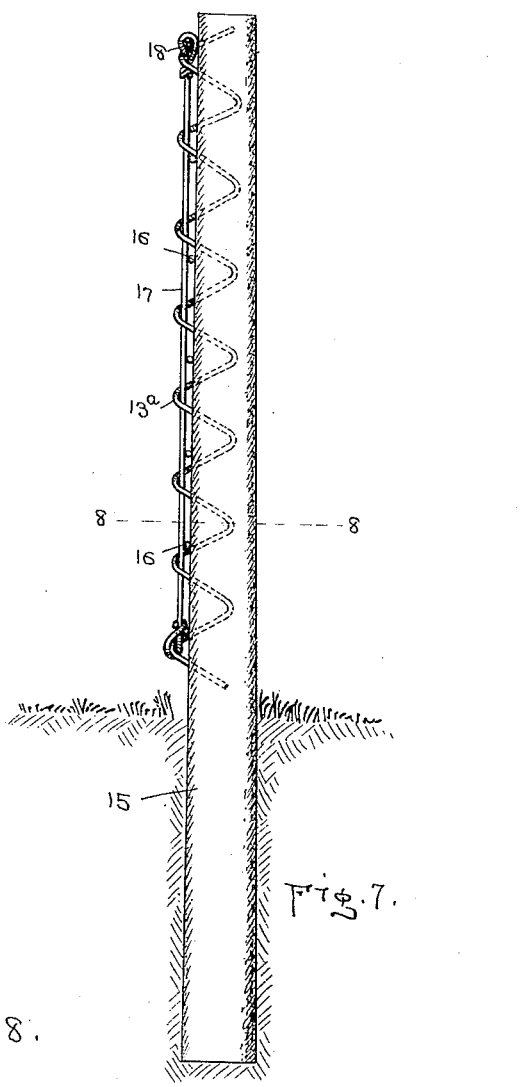
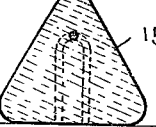
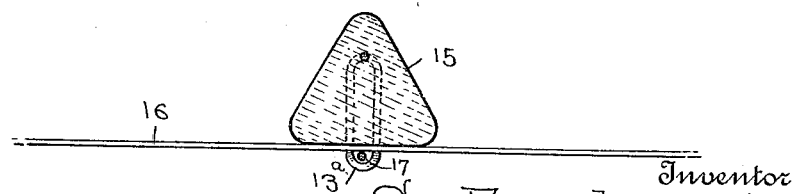

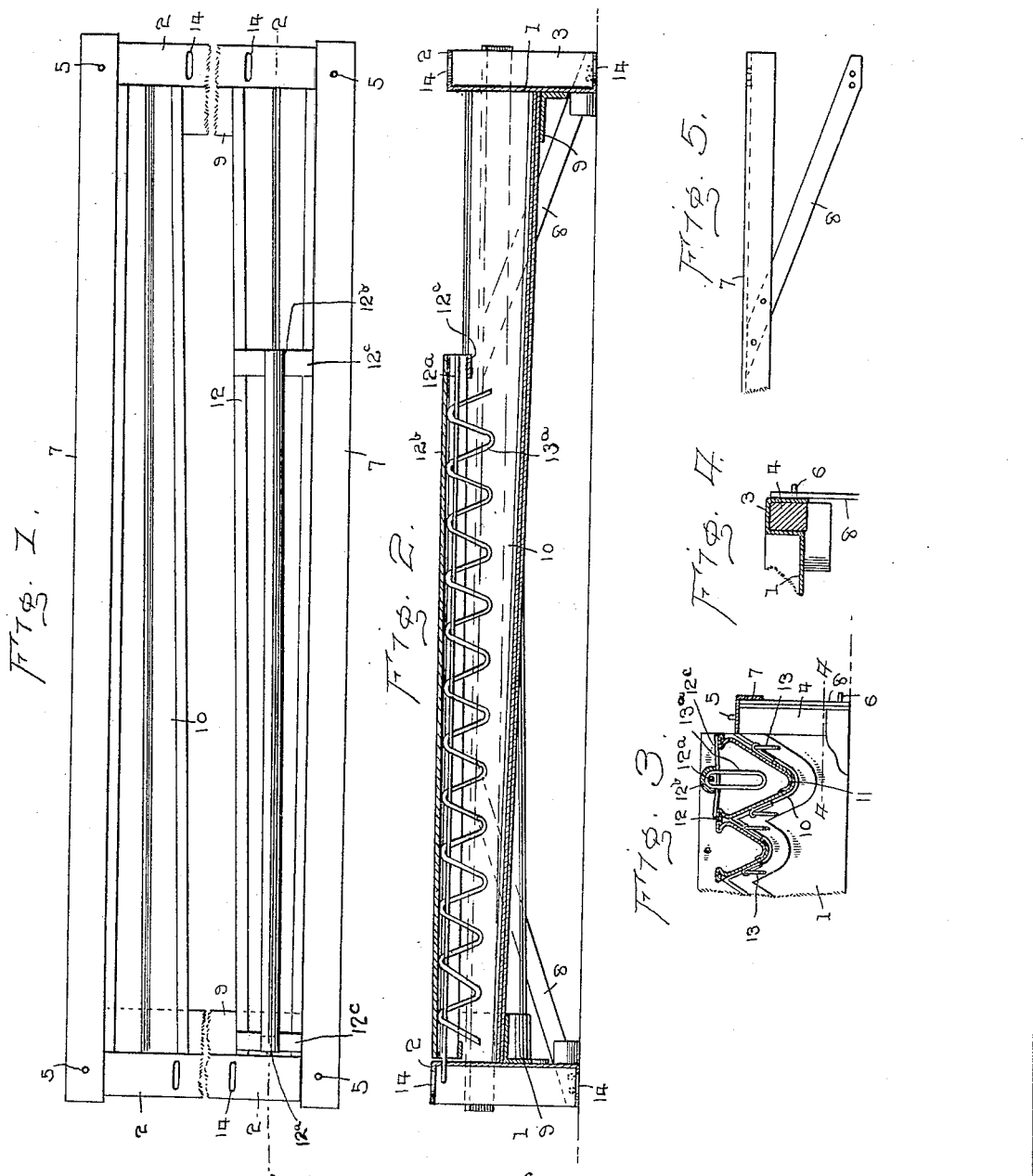

UNITED STATES PATENT OFFICE.

GEORGE ARMBRUSTER, OF FAIRBURY, ILLINOIS.

PORTABLE MOLD FOR FENCE-POSTS.

1,131,653.  Specification of Letters Patent.  Patented Mar. 16, 1915.

Application filed January 24, 1914. Serial No. 814,119.

*To all whom it may concern:*

Be it known that I, GEORGE ARMBRUSTER, a citizen of the United States, residing at Fairbury, in the county of Livingston and State of Illinois, have invented certain new and useful Improvements in Portable Molds for Fence-Posts; and I do hereby declare the following to be a full, clear, and exact description of the invention, such as will enable others skilled in the art to which it appertains to make and use the same.

This invention relates to portable molds for forming fence posts, and is especially adapted for the poured process of molding.

An object of the invention is to provide a detachable supporting frame for the side walls of the mold, and having separable ends constituting the end walls of the mold.

Another object is to provide a mold consisting essentially of two detachable parts so shaped as to form a triangular and longitudinally tapered fence post, having rounded corners.

Another object is to provide means for supporting fence securing devices in accurate position within the molds.

In the accompanying drawings, Figure 1 represents a top plan view partly broken away, of my improved molding apparatus. Fig. 2 represents a longitudinal sectional view thereof, on the line 2—2 of Fig. 1. Fig. 3 represents a fragmentary transverse sectional view through the mold. Fig. 4 represents a sectional view on the line 4—4 of Fig. 3. Fig. 5 represents a fragmentary view of the end and brace of one of the side rails of the supporting frame for the molds. Fig. 6 represents a front elevation of a post formed in one of the molds. Fig. 7 represents a side elevation thereof, and, Fig. 8 represents a sectional view on the line 8—8 of Fig. 7.

Referring to the drawings, wherein similar reference numerals designate corresponding parts throughout the several views, 1 indicates the ends of the supporting frame for the mold, having the outwardly directed upper and lower flanges 2. The opposite ends of each end 1 are bent as at 3, to provide housings for the blocks 4, having upwardly projecting pins 5 at their upper ends and laterally projecting pins 6, at their lower ends. The side walls 7 of the frame, are preferably formed of angle bars and are apertured at their opposite ends to receive the pins 5, so as to hold the ends 1 rigidly in spaced relation. Bracing and strengthening members 8 are secured to the side rails 7, and are also apertured to receive the lower pins 6. A plurality of apertures are formed in the ends of the side rails 7, and braces 8, so as to permit the ends 1 to be secured at various distances apart.

The parts of the supporting frame hereinbefore described are readily detachable, as are also the parts of the mold to be hereinafter described and the entire apparatus may be conveniently and quickly packed for transportation.

Mold supporting members 9 are secured to the inner faces of the ends 1 and are formed so as to provide a plurality of seats of various depths. The molds 10 are preferably formed in two parts and are curved at their lower edges 11 and adapted to overlap when assembled, as clearly shown in Fig. 3. The parts of the mold are gradually tapered longitudinally, and the upper longitudinal edges 12 are also curved so as to impart rounded corners to the post molded therein, and are bent outwardly and upon themselves so as to leave no space between the molds through which the plastic material may be wasted during the pouring operation. Handles 13 are attached to each part of the mold for convenience in assembling the latter and for removing the molds after the posts have been formed. The large ends of the tapered molds are adapted to be seated within the deep seats of the supporting member 9, and the smaller ends thereof are adapted to be seated in the shallower seats of said member, whereby the upper edges of the mold lie in a horizontal plane.

In use, the parts of the molds are adapted to be assembled and disposed in the proper position within the supporting frame comprising the ends 1 and side rails 7. The molds are then filled with plastic material and the latter left therein to mature or harden. At any time desirable during the hardening of the posts within the molds, either or both of the ends 1 may be moved outwardly by adjusting the pins 5 and 6 in the next aperture of the side rails 7 and braces 8, the seats 10 being of sufficient width to accommodate such adjustment. The flanges 2 of the ends 1 are provided with elongated apertures 14 adapted to receive bolts positioned through the flanges of the frames when the latter are stacked one upon the other. The vertical walls of the ends 1 are also apertured a short distance above the tops of the molds 10 and between the upper edges of the parts thereof to receive one end of the rods 12ª disposed within and supporting one end of cylindrical holders 12ᵇ having the free longitudinal edges extending downwardly and parallel. The holders 12ᵇ extend from the end and adjacent the small end of the mold a distance past the center of the latter and are supported at this end above said mold by laterally extending arms 12ᶜ. The rods 12ª are adapted to be positioned through flattened wire coils 13ª which latter are removably and snugly engaged within the holders 12ᵇ. The coils 13ª depend from the rods 12ª into the plastic composition contained in the molds, and after the composition has matured the coils are obviously embedded therein.

Referring to Figs. 6, 7 and 8 wherein is shown the construction of posts molded in the above described mold, 15 indicates the post which is tapered from the lower to the upper end as a result of the peculiar shape of the parts of the mold 10. In cross section, the posts 15 are triangular in shape and each of the three corners thereof are rounded as shown in Fig. 7, as a result of the turned edges of the parts of the mold 10. In the finished post, the coil 13ª is firmly embedded within the post while portions thereof extend outwardly in the form of loops.

In use, the strands 16 of any form of fencing which it is desired to secure to the post, are laid against said post in such position that the strands 16 are disposed between the projecting loop portions of the coil 13ª. A clamping bar 17 is then positioned through the loops of the coil 13ª and over the strands 16 of the fence, whereby the latter are securely clamped against the post but are permitted sufficient longitudinal movement thereon to compensate for expansion and contraction due to atmospheric conditions. The lower end of the clamping bar 17 is suitably looped or otherwise secured over the bottom loop of the coil 13ª, while the upper end thereof may be looped or otherwise secured over the top loop of said coil. The upper loop in the clamping rod 17 may, if desired, receive a suitable barbed wire 18.

What I claim is:—

1. A molding apparatus comprising a supporting frame, molds removably seated in said frame, removable rods extending through one end of said frame and disposed to support flattened coil members removably engaged over said rods, holders inclosing said coil members and said rods, and laterally projecting arms carried by said holders engaging the tops of said molds.

2. A molding apparatus comprising a supporting frame, molds removably seated in said frame, a longitudinal running holder supported at each end from each of said molds, and rods removably positioned within said holders and engaged at one end through the adjacent end of said supporting frame to hold flattened coil members depending from said rod.

3. A molding apparatus comprising: end members detachably mounted to each other, side members detachably mounted upon said end members, detachable bracing members bracing said side members to said end members, right angular supporting means disposed on the inside of said end members, sectional molds supported by said supporting members, a longitudinal rod carried above the plane of each of said molds, one end of which is supported by one of said end members, and a longitudinal running holder having extensions thereto supported from each of said molds by means of said extensions, one end of which supporting said rod and said holders being of a contour to allow of a removable flattened coil member to be passed between said rod and said holder.

4. A molding apparatus comprising: a demountable frame, a right angular supporting member mounted on the inner face of each end of said frame, a plurality of sectional molds supported by said last mentioned members, a longitudinal runner holder approximately semicircular in transverse section positioned above the plane of each of said molds, projections extending from each end of said holder over each of said molds and supporting said holder in position, a longitudinal running rod supported at one end in said demountable frame and in said holder, said rod adapted to support the coils of a coil member between said rod and said holder.

In testimony whereof I have signed my name to this specification in the presence of two subscribing witnesses.

GEORGE ARMBRUSTER.

Witnesses:
J. W. McDOWELL,
ELMER B. RAMSEY.